United States Patent
Sartori et al.

(10) Patent No.: US 6,559,104 B2
(45) Date of Patent: May 6, 2003

(54) METHOD FOR INHIBITING CORROSION USING CERTAIN AROMATIC ACIDIC SPECIES

(75) Inventors: Guido Sartori, Milan (IT); David Craig Dalrymple, Bloomsbury, NJ (US); Saul Charles Blum, Edison, NJ (US); Liza Marie Monette, Whitehouse, NJ (US); Mohsen S. Yeganeh, Piscataway, NJ (US); Andreas Vogel, Steinfeld (DE)

(73) Assignee: ExxonMobil Research and Engineering Co., Annandale, NJ (US)

( * ) Notice: Subject to any disclaimer, the term of this patent is extended or adjusted under 35 U.S.C. 154(b) by 0 days.

(21) Appl. No.: 09/905,149

(22) Filed: Jul. 13, 2001

(65) Prior Publication Data

US 2003/0013621 A1 Jan. 16, 2003

(51) Int. Cl.$^7$ ............................ C23F 11/12; C09K 15/06
(52) U.S. Cl. ..................... 507/260; 507/939; 252/396; 252/407; 166/902; 422/7; 427/435
(58) Field of Search .................. 252/396, 407; 507/260, 263, 266, 267, 939; 106/14.13, 14.23, 14.24, 14.28; 166/902, 242.4; 427/435; 422/12, 17, 7; 148/320

(56) References Cited

U.S. PATENT DOCUMENTS

| | | | |
|---|---|---|---|
| 3,730,485 A | | 5/1973 | Strang et al. ................ 252/57 |
| 4,652,435 A | * | 3/1987 | Natsuume et al. ........... 423/265 |
| 4,941,994 A | | 7/1990 | Zetlmeisl et al. ......... 252/389.23 |
| 5,085,793 A | | 2/1992 | Burns et al. .................. 252/79 |
| 5,242,621 A | | 9/1993 | Miller et al. ................ 252/396 |
| 5,258,532 A | | 11/1993 | Lawson ....................... 556/132 |
| 5,552,085 A | | 9/1996 | Babaian-Kibala ...... 252/389.23 |
| 5,630,964 A | | 5/1997 | Babaian-Kibala et al. ...... 252/389.23 |
| 5,798,319 A | * | 8/1998 | Schlosberg et al. ......... 507/138 |
| 6,268,323 B1 | * | 6/2001 | Honda et al. ................ 510/176 |

FOREIGN PATENT DOCUMENTS

| | | | |
|---|---|---|---|
| GB | 8667 | 1/1907 | |
| GB | 809198 | 2/1959 | |
| GB | 2246347 A | 1/1992 | |
| JP | 08269751 | 10/1996 | ........... C23F/11/12 |
| WO | WO 0011091 | 3/2000 | ........... C09D/9/00 |

OTHER PUBLICATIONS

AN 1995: 7334—ENCOMPLIT; ENCOMPLIT2, "The relationship between the radical scavenging effects and the anticorrosive properties of polyphenol", GUST, J., et al.—Corrosion V51 N. 1 37–44 (Jan. 1995) ISSN: 0010–9312.

AN 1995: 311171 CAPLUS, "Relationship between radical scavenging effects and anticorrosive properties of polyphenols", GUST, J. et al—Corrosion (Houston) (1995), 51 (1), 37–44.

AN 1993: 75263 CA, "Alkyl derivatives of resorcinol as antisludge additives for jet fuels", Lykov, O.P., et al.—Khim. Tekhnol. Topl. Masel (1980), (5), 18–21.

AN 1990: 5401—ENCOMPLIT; ENCOMPLIT2, "Carboxylic acids as corrosion inhibitors for aluminium in acidic and alkaline solutions", Anti–Corrosion Methods and Materials V37 N.3 4–8 (Mar. 1990) ISSN: 0003–5599.

AN 1990: 410554 CAPLUS, "Carboxylic acids as corrosion inhibitors for aluminum in acidic and alkaline solutions", Moussa, M. N., et al.—Anti–Corros. Methods and Materials (1990), 37(3), 4–8.

AN 1983: 92250 HCAPLUS, "Effect of substituents in aromatic hydrocarbons in the efficiency in protecting of steel from stress corrosion cracking in gas and petroleum recovery", Starchak, V. G., et al.—Korroz. Zashch. Neftegazov. Prom–sti. (1982), (11), 9–10.

AN 1983: 110139 HCAPLUS, "Study of high–boiling fractions of shale oil by a combined IR and NMR spectroscopic method", Chernysheva, K. B., et al.—Khim. Tverd. Topl. (Moscow) (1983), (1), 55–60.

AN 1979: 91154 CAPLUS, "Corrosion inhibitors 23(1). Does there exist a structure–efficiency relation in the organic inhibitors of aluminum corrosion?", Horner, L., et al.—Werkst. Korros. (1978), 29(10), 654–64.

AN 1972: 7713 ENCOMPLIT; ENCOMPLIT2, "Corrosion inhibitors—15. Mode of action of inhibitors of the corrosion of iron in acids and in sodium chloride solutions in the presence of oxygen", Horner, L.—Werkst Korros V23 N.6 466–74 (Jun. 1972).

AN 1996: 692850 CAPLUS, "Effect of phosphonate inhibitors on calcite nucleation kinetics as a function of temperature using light scattering in an autoclave", Jonasson, Ralph G., et al.—Chem. Geol. (1996), 132 (1–4), 215–225.

CAPLUS COPYRIGHT 1999 ACS, AN 1992: 615939 Interaction of phosphonate scale inhibitors with mineral surfaces during . . . Jonasson, R.G.

* cited by examiner

Primary Examiner—Joseph D. Anthony
(74) Attorney, Agent, or Firm—Linda M. Scuorzo

(57) ABSTRACT

The present invention relates to a method for inhibiting high temperature corrosion of corrosion prone metal surfaces by organic acid-containing petroleum streams by providing an effective corrosion-inhibiting amount of an additive aromatic compound tri-substituted with acidic functionalities selected from 5-hydroxyisophthalic acid and 1,3,5-benzenetricarboxylic acid, typically up to 1000 wppm, to the metal surface.

2 Claims, No Drawings

METHOD FOR INHIBITING CORROSION USING CERTAIN AROMATIC ACIDIC SPECIES

FIELD OF THE INVENTION

The field of the invention relates inhibiting the high temperature corrosivity of petroleum oils through the use of certain substituted aromatic acids.

BACKGROUND OF THE INVENTION

Whole crudes and crude fractions with acid, including high organic acid content such as those containing carboxylic acids, (e.g., naphthenic acids), are corrosive to the equipment used to distill, extract, transport and process the crudes. Solutions to this problem have included use of corrosion-resistant alloys for equipment, addition of corrosion inhibitors, or neutralization of the organic acids with various bases.

The installation of corrosion-resistant alloys is capital intensive, as alloys such as 304 and 316 stainless steels are several times the cost of carbon steel. The corrosion inhibitors solution is less capital intensive; however costs can become an issue.

The effectiveness of phosphorus compounds against corrosion was discovered in 1906 (Coslett, British Patent 8,667 for phosphoric acid), and the use of these compounds is well known for aqueous systems.

Additionally, organic polysulfides (Babaian-Kibala, U.S. Pat. No. 5,552,085), organic phosphites (Zetlmeisl, U.S. Pat. No. 4,941,994), and phosphate/phosphite esters (Babaian-Kibala, U.S. Pat. No. 5,630,964), all of which have been claimed to be effective in a hydrocarbon-rich phase against naphthenic acid corrosion. However, their high oil solubility incurs the risk of distillate sidestream contamination by phosphorus. Furthermore, there is also concern for potential downstream impact of phosphorus, such as the possibility of catalyst poisoning by phosphorus-containing compounds, and concerns for downstream units. Mitigation options that use phosphorus and sulfur-free compounds, either in a refinery pipestill or in subsequent downstream process units, are also desirable since entrained phosphorus contamination in distillate sidestreams can result in downstream catalyst deactivation and/or product quality problems. These concerns preclude addition of such inhibitors to sidestreams subjected to catalytic processing. Also, since phosphorus can concentrate in the residuum, processing or product options for the latter may become limited. Any addition of sulfur from the inhibitor also requires subsequent processing for their removal as these may contribute to environmental burdens or product instability. Parahydrocarbyl-substituted phenol or thiophenol dicarboxylic acids have been reported as anti-corrosion and anti-rust additives in liquid hydrocarbon fuels and lubricants used in internal combustion engines (Strang U.S. Pat. No. 3,730,485). However, their formulas specifically require a para hydrocarbyl group in addition to the three acidic functionalities on the aromatic ring. In a formulated oil, these additives would be exposed to engine temperatures not exceeding 200° C. Fused ring compounds having specifically hydroxy, carboxylic acid, and hydoxyalkyl groups have also been reported as having corrosion inhibition properties (Lawson, U.S. Pat. No. 5,258,532) but were applied to aqueous systems.

There remains a continuing need to develop additional options for mitigating the corrosivity of acidic crudes which are low cost, compatible with downstream processes and with product quality requirements. Applicants' invention addresses these needs.

The acidic functionalities are preferably acidic —OH and/or —COOH groups. These additives are sulfur and phosphorus free.

SUMMARY OF THE INVENTION

An embodiment of the present invention is a method for inhibiting high temperature corrosion of corrosion prone metal surfaces caused by organic, typically naphthenic acids in petroleum streams by providing the metal surface with an effective, corrosion-inhibiting amount of certain aromatic compounds tri-substituted with acidic functionalities on the aromatic ring said functionalities are selected from —OH and —COOH groups. These triacids are selected from 5-hydroxyisophthallic acid and 1,3,5-benzenetricarboxylic acid, and 1,2,3-benzenetricarboxylic acid.

Another embodiment of the invention is a method to inhibit the high temperature corrosivity of an organic acid-containing petroleum stream or oil by providing a corrosion prone metal-containing surface to be exposed to the acid-containing petroleum stream with an effective, corrosion-inhibiting amount of the specified inhibitors/additives. The providing of the inhibitor may be carried out in the presence of the acid-containing petroleum stream and/or as a pretreatment of the corrosion prone metal surface before exposure to the acid-containing petroleum stream. Another embodiment provides for the products produced by the processes herein.

The present invention may suitably comprise, consist or consist essentially of the elements or steps disclosed and may be practiced in the absence of an element or step not disclosed.

DETAILED DESCRIPTION OF THE PREFERRED EMBODIMENTS

Some petroleum streams, including petroleum oils, contain acids, including organic acids, such as naphthenic acids, that contribute to high temperature corrosion of internal surfaces of refinery equipment. Organic acids generally fall within the category of naphthenic and other organic acids. Naphthenic acid is a generic term used to identify a mixture of organic carboxylic acids present in petroleum stocks. Naphthenic acids may be present either alone or in combination with other organic acids, such as phenols. Naphthenic acids alone or in combination with other organic acids can cause corrosion at high temperatures in non-aqueous or essentially non-aqueous (hydrocarbon) environments, i.e., at temperatures ranging from about 200° C. (329° F.) to 420° C. (790° F.). Inorganic acids also may be present. Inhibition of corrosion due to the organic acid content of such petroleum streams, is desirable in order to increase the corrosion resistance, and thus useful life of internal (i.e., tube-side surfaces of reactors and other equipment having an external or shell-side and an internal or tube-side) metal surfaces of refinery equipment that are high temperature corrosion prone and are to be exposed to organic acid-containing petroleum stream at process conditions that result in high temperature corrosion of such internal surfaces. Mitigation options that use sulfur and phosphorus-free compounds as additives or inhibitors are advantageous since the presence of phosphorus and sulfur can affect downstream catalysts and/or product quality. Examples of such equipment include heat exchanger surfaces, pipestill vessels, transfer lines and piping, and pumps.

Petroleum streams that can be treated herein are any organic acid-containing petroleum streams, including whole crudes and crude oil fractions. As used herein, the term whole crudes means unrefined, non-distilled crudes.

Examples of metal surfaces that may benefit from treatment are any ferrous metals, such as carbon steel, and iron alloys.

The acidic aromatic species that may be used as inhibitors/additives are aromatic triacids, that is aromatic rings tri-substituted with acidic functionalities selected from —OH and —COOH groups. These additives/inhibitors are selected from 5-hydroxyisophthalic acid, 1,3,5-benzenetricarboxylic acid, and 1,2,3-benzenetricarboxylic acid.

Treatment temperatures will preferably range from about ambient to typically about 450° C., preferably up to 350° C.

The inhibitor is introduced in either a batch or continuous process to untreated (unadditized) petroleum oil. Additionally or separately, the metal surface may also be preconditioned by adding to a low acidity petroleum oil an amount of additive/inhibitor effective to inhibit corrosion in the organic acid containing petroleum oil to be treated before combination with the petroleum stream containing organic acids, and blending them by techniques known in the industry. Additional effective amounts may be introduced into the organic acid-containing petroleum stream itself as needed to maintain corrosion inhibition. Desirably, a continuous dosing of inhibitor to achieve and maintain the recommended effective level of corrosions inhibition is delivered. Thus, the additive/inhibitor may be introduced to the hydrocarbon rich environment or phase and/or to the metal surface itself.

The inhibitor is added in effective amounts, typically up to a total of 1000 wppm, more typically an effective amount of from about 10–100 wppm. The amount or concentration to be used is determined based on the acidity of the petroleum stream and the desired degree of corrosion inhibition needed. Typically, a reduction corresponding to at least forty (40) percent corrosion rate reduction can be achieved.

The effectiveness of corrosion inhibition is typically estimated in the laboratory by weight loss of metal coupons exposed to organic acids with and without the additive/inhibitor present. The relative decrease in metal weight loss due to the presence of corrosion inhibitor is a measure of the effectiveness of corrosion inhibition.

Naphthenic acid concentration in crude oil is determined by titration of the oil with KOH, until all acids have been neutralized. The concentration is reported in Total Acid Number (TAN) unit, i.e., mg of KOH needed to neutralize 1 gram of oil. It may be determined by titration according to ASTM D-664. Any acidic petroleum oil may be treated according to the present invention, for example, oils having an acid neutralization of about 0.5 mg KOH/g or greater.

The following examples illustrate the invention.

EXAMPLE 1

The reaction apparatus consisted of a 500-ml round bottom flask under nitrogen atmosphere. 288.9 grams of Tufflo oil was put in the flask, then 12 mg of 5-hydroxyisophthalic acid were added. The flask contents were brought to 300° C. and a carbon steel coupon with dimensions 7/16 in.×11/16 in.×1/8 in. was immersed. Initial coupon weight was determined to be 4.7346 g. After an hour, 11.1 grams of naphthenic acids were added, giving a total acid number of 8 mg KOH/g. The oil was kept at 300° C. for an additional 4 hours. The coupon weighted 4.7283 g after this procedure, corresponding to a corrosion rate of 119 mils per year.

EXAMPLE 2

Comparative

The procedure was the same as in Example 1, without the presence of 5-hydroxyisophthalic acid. The coupon was kept in oil at 300° C. for four hours. The weight loss corresponded to a corrosion rate of 480 mils per year. Thus, in example 1, a 75% corrosion rate reduction was measured when 5-hydroxyisophthalic acid was present versus Example 2 when this compound was absent.

EXAMPLE 3

Example 1 was repeated, replacing 5-hydroxyisophthalic acid with an equal amount (12 mg) of 1,2,3-benzenetricarboxylic acid. The measured weight loss corresponded to a corrosion rate of 289 mils per year. Thus, in Example 3, a 40% corrosion rate reduction was measured when 1,2,3-benzenetricarboxylic acid was present versus Example 2 when this compound was absent.

EXAMPLE 4

Example 1 was repeated, beginning with a lower total acid number. The amount of Tufflo oil was 295.8 g and the amount of naphthenic acids was 4.2 g. The total acid number was 3 mg. KOH/g oil. Otherwise, the procedure was the same as in Example 1. The coupon weighed 4.7891 g at the beginning and at the end, showing negligible corrosion rate.

EXAMPLE 5

Comparative

Example 2 was repeated, beginning with a lower total acid number. The amounts of Tufflo oil and naphthenic acids were the same as in Example 4, for a total acid number of 3 mg KOH/g oil, but without 5-hydroxyisophthalic acid. The measured weight loss corresponded to a corrosion rate of 141 mils per year.

EXAMPLE 6

Comparative

Example 5 was repeated under the same conditions. The measured weight loss corresponded to a corrosion rate of 130 mils per year. Thus, in Example 4, close to 100% corrosion rate reduction was measured when 5-hydroxyisophthalic acid was present versus Example 5 or 6 when this compound was absent.

EXAMPLE 7

Example 4 was repeated, replacing 5-hydroxyisophthalic acid with an equal amount of 1,3,5-benzenetricarboxylic acid. Otherwise said, Example 3 was repeated, using a smaller amount of naphthenic acids, i.e., 4.2 g, for a total acid number of 3 mg. KOH/g oil. The coupon weighed 4.7414 g at the beginning and at the end, showing negligible corrosion rate. Thus, in Example 7, close to 100% corrosion rate reduction was measured when 1,3,5-benzenetricarboxylic acid was present versus Example 5 or 6 when this compound was absent.

What is claimed is:

1. A process for inhibiting the high temperature corrositivity at a temperature of from 200° to 420° C. of an organic acid containing petroleum stream in contact with a corrosion prone metal-containing surface, the process comprises adding a corrosion inhibiting effective amount of a ti-substituted aromatic compound selected from the group consisting of 5-hydroxyisophthalic acid, 1,3,5-benzenetricarboxylic acid, 1,2,3-benzenetricarboxylic acid, and mixtures thereof to said organic acid containing petroleum stream.

2. The process of claim 1, wherein the amount of inhibitor is an effective amount of up to 1000 wppm.

* * * * *